(12) United States Patent
Shapira et al.

(10) Patent No.: US 7,562,030 B1
(45) Date of Patent: Jul. 14, 2009

(54) METHOD AND APPARATUS FOR REAL-TIME REPORTING OF ELECTRONIC COMMERCE ACTIVITY

(75) Inventors: Elijahu Shapira, Portland, OR (US); Victor Lu, Portland, OR (US)

(73) Assignee: WebTrends, Inc., Portland, OR (US)

( * ) Notice: Subject to any disclaimer, the term of this patent is extended or adjusted under 35 U.S.C. 154(b) by 2046 days.

(21) Appl. No.: 09/707,541

(22) Filed: Nov. 6, 2000

Related U.S. Application Data

(60) Provisional application No. 60/163,710, filed on Nov. 5, 1999.

(51) Int. Cl.
G06F 17/30 (2006.01)
(52) U.S. Cl. .................................................. 705/10
(58) Field of Classification Search ............. 705/35, 705/36, 37, 10, 26, 27, 14; 707/104.1, 1–10, 707/102, 104
See application file for complete search history.

(56) References Cited

U.S. PATENT DOCUMENTS 5,948,061 A 9/1999 Merriman et al.
5,987,480 A * 11/1999 Donohue et al. ......... 715/501.1
6,128,624 A * 10/2000 Papierniak et al. ....... 707/104.1
6,256,664 B1 * 7/2001 Donoho et al. ............. 709/204
6,505,242 B2 * 1/2003 Holland et al. ............. 709/219

OTHER PUBLICATIONS

Business Editors / High Tech Writers. "WebSide Story Introduces StatMarket eData Mining—the Most Poweful Tool Available for Gathering E-Commerce Knowledge." Business Wire. New York: Sep. 21, 1999. p. 1.*

* cited by examiner

*Primary Examiner*—Susanna M Diaz
(74) *Attorney, Agent, or Firm*—Marger Johnson & McCollom, P.C.

(57) ABSTRACT

A method and apparatus is disclosed for tracking and reporting electronic commerce activity over a web site that is stored on a first server coupled to a wide area network. The web page is programmed to include data fields reflecting commerce transaction activity and data mining code. The web page is uploaded to a visitor computer responsive to a request over the wide area network from the visitor computer. Commerce information is accepted within the data fields of the web page at the visitor computer to form a completed web page. The data mining code is operated on the visitor computer to obtain technical and commercial data and sent to a second server on the wide area network for logging and analysis.

9 Claims, 5 Drawing Sheets

METHOD AND APPARATUS FOR REAL-TIME REPORTING OF ELECTRONIC COMMERCE ACTIVITY

BACKGROUND OF THE INVENTION

The present application relates to compiling and reporting data associated with activity on a network server and more particularly to compiling and reporting server data that is associated with commercial activity on a server. This application is a continuation of U.S. Provisional Patent 60/163,710 filed Nov. 5, 1999 whose contents are incorporated herein for all purposes.

Programs for analyzing traffic on a network server, such as a worldwide web server, are known in the art. One such prior art program is described in U.S. patent application Ser. No. 09/240,208, filed Jan. 29, 1999, for a Method and Apparatus for Evaluating Visitors to a Web Server, which is incorporated herein by reference for all purposes. WebTrends Corporation owns this application and also owns the present provisional application. In these prior art systems, the program typically runs on the web server that is being monitored. Data is compiled, and reports are generated on demand—or are delivered from time to time via email—to display information about web server activity, such as the most popular page by number of visits, peak hours of website activity, most popular entry page, etc.

Analyzing activity on a worldwide web server from a different location on a global computer network ("Internet") is also known in the art. To do so, a provider of remote web-site activity analysis ("service provider") generates JavaScript code that is distributed to each subscriber to the service. The subscriber copies the code into each web-site page that is to be monitored. When a visitor to the subscriber's web site loads one of the web-site pages into his or her computer, the JavaScript code collects information, including time of day, visitor domain, page visited, etc. The code then calls a server operated by the service provider—also located on the Internet—and transmits the collected information thereto as a URL parameter value. Information is also transmitted in a known manner via a cookie. Each subscriber has a password to access a page on the service provider's server. This page includes a set of tables that summarize, in real time, activity on the customer's web site.

The above-described arrangement for monitoring web server activity by a service provider over the Internet is generally known in the art. Information analyzed in prior art systems, however, consists of what might be thought of as technical data, such as most popular pages, referring URLs, total number of visitors, returning visitors, etc. However, the need still remains for a way to track and report commercial activity on the web site—a feature missing in prior art web commerce analysis tools.

SUMMARY OF THE INVENTION

A methods and apparatus is disclosed for tracking and reporting electronic commerce activity over a web site that is stored on a first server coupled to a wide area network. The web page is programmed to include data fields reflecting commerce transaction activity and data mining code. The web page is uploaded to a visitor computer responsive to a request over the wide area network from the visitor computer. Commerce information is accepted within the data fields of the web page at the visitor computer to form a completed web page. The data mining code is operated on the visitor computer to obtain technical and commercial data and sent to a second server on the wide area network for logging and analysis.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 2 is an illustration of a conventional web page order form including embedded programmatic code operable to gather commercial activity according to the invention.

DETAILED DESCRIPTION

Figure 1:
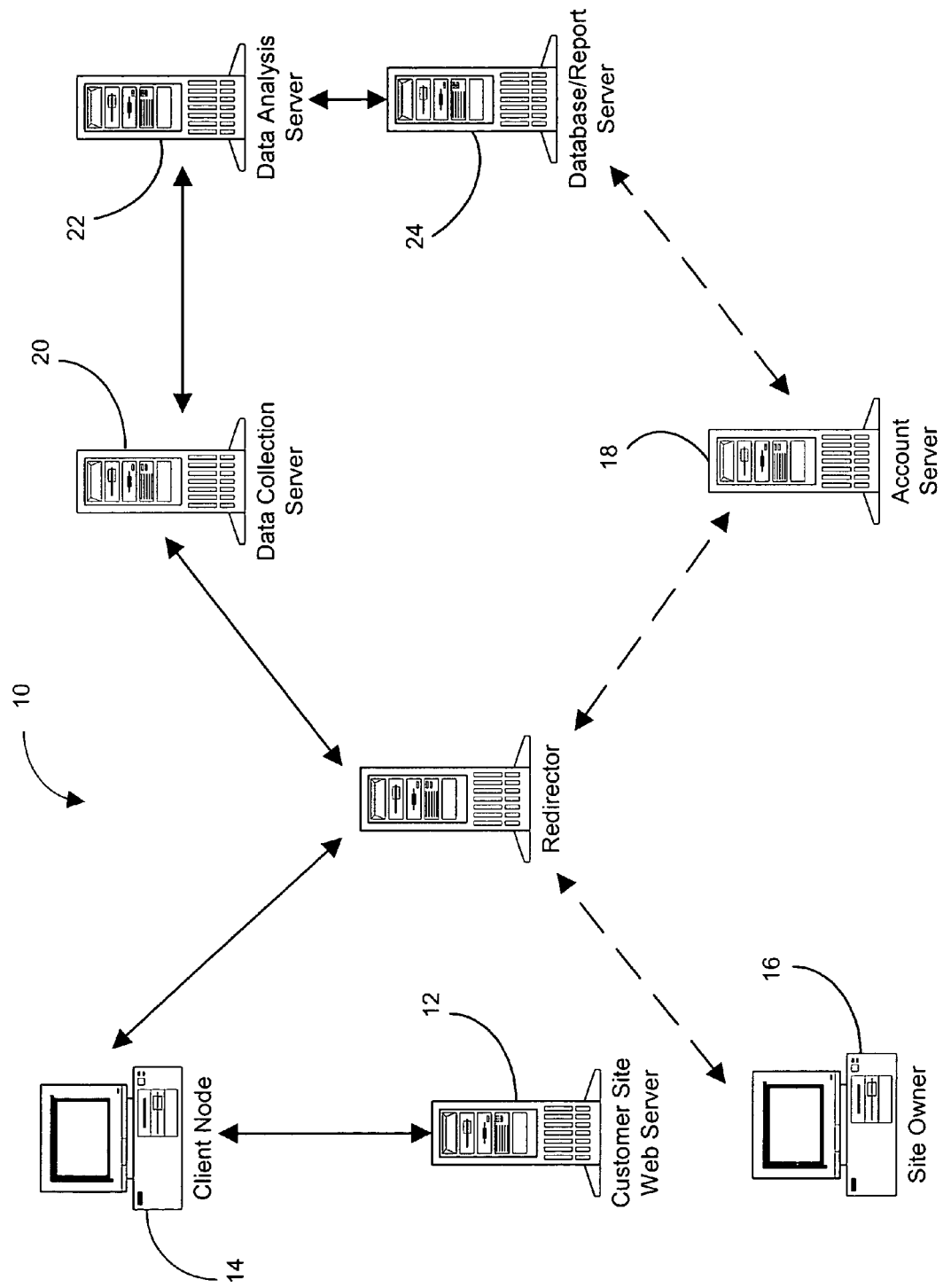
FIG. 1 is a schematic view of a portion of the Internet on which the invention is operated.

Turning now to FIG. 1, indicated generally at 10 is a highly schematic view of a portion of the Internet. FIG. 1 depicts a system implementing the present invention. Included thereon is a worldwide web server 12. Server 12, in the present example, is operated by a business that sells products via server 12, although the same implementation can be made for sales of services via the server. The server includes a plurality of pages that describe the business and the products that are offered for sale. It also includes an order page, like the one shown in FIG. 2, that a site visitor can download to his or her computer, like computer 14, using a conventional browser program running on the computer. The order form typically contains—for products—the national currency that the seller accepts, an identification of the product, the number of products sold, and the unit price for each product. After a site visitor at computer 14 fills in the information in FIG. 2, the visitor actuates a screen-image button 15 that places the order by transmitting the information from computer 14 to server 12 over the network. Upon receipt of this information, server 12 typically confirms the order via email to computer 14. The seller then collects payment, using a credit-card number provided in the FIG. 2 form, and ships the product.

As mentioned above, it would be advantageous to the seller to have an understanding about how customers and potential customers use server 12. As also mentioned above, it is known to obtain this understanding by analyzing web-server log files at the server that supports the selling web site. It is also known in the art to collect data over the Internet and generate activity reports at a remote server.

When the owner of server 12 first decides to utilize a remote service provider to generate such reports, he or she uses a computer 16, which is equipped with a web browser, to visit a web server 18 operated by the service provider. On server 18, the subscriber opens an account and creates a format for real-time reporting of activity on server 12.

To generate such reporting, server 18 provides computer 16 with a small piece of code, typically JavaScript code (data mining code). The subscriber simply copies and pastes this code onto each web page maintained on server 12 for which monitoring is desired. When a visitor from computer 14 (client node) loads one of the web pages having the embedded code therein, the code passes predetermined information from computer 14 to a server 20—also operated by the service provider—via the Internet. This information includes, e.g., the page viewed, the time of the view, the length of stay on the page, the visitor's identification, etc. Server 20 in turn transmits this information to an analysis server 22, which is also maintained by the service provider. This server analyzes the raw data collected on server 20 and passes it to a database server 24 that the service provider also operates.

Figure 3:
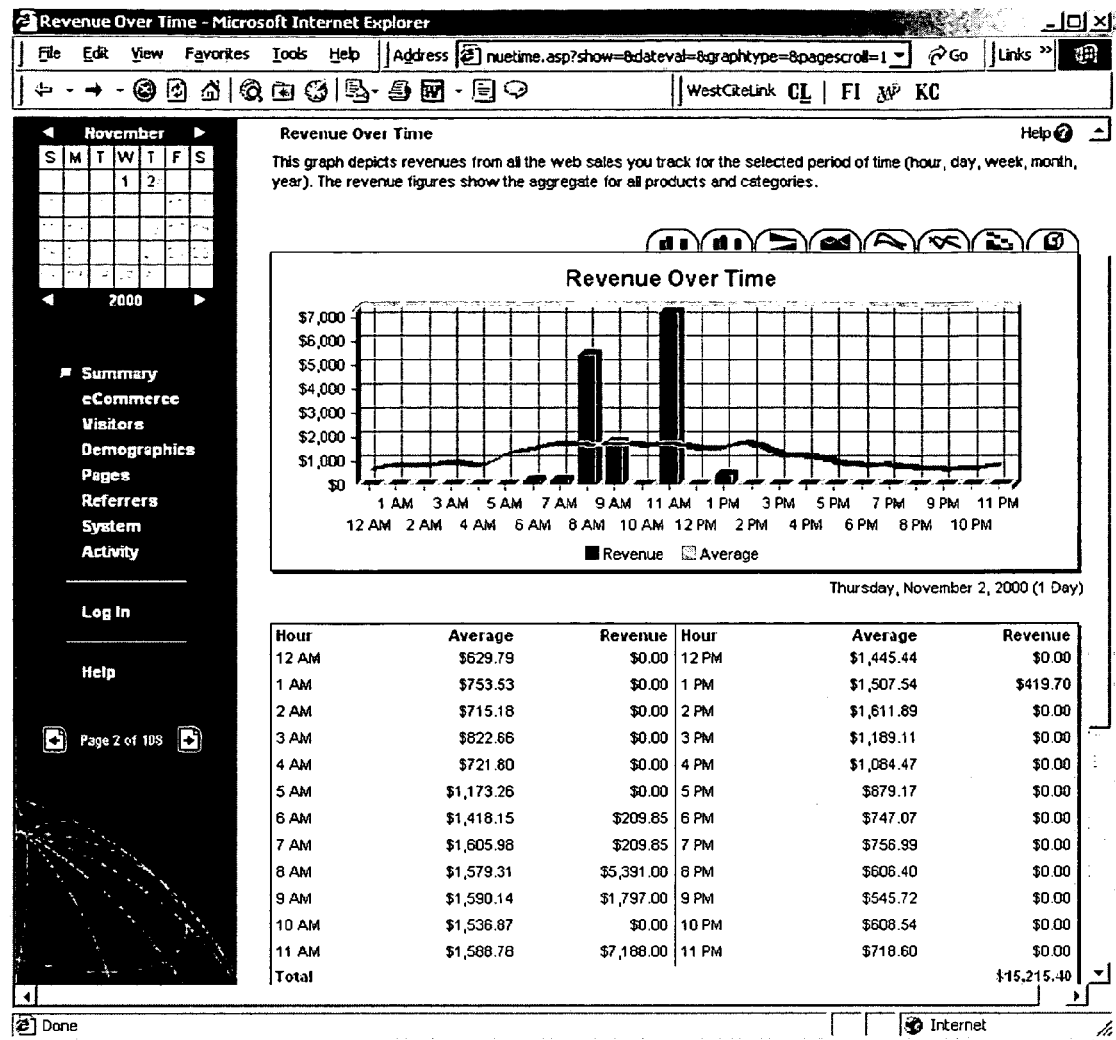
FIG. 3 is an example of a report showing revenue trends over time throughout a business day as tracked and reported by the present invention.
Figure 4:
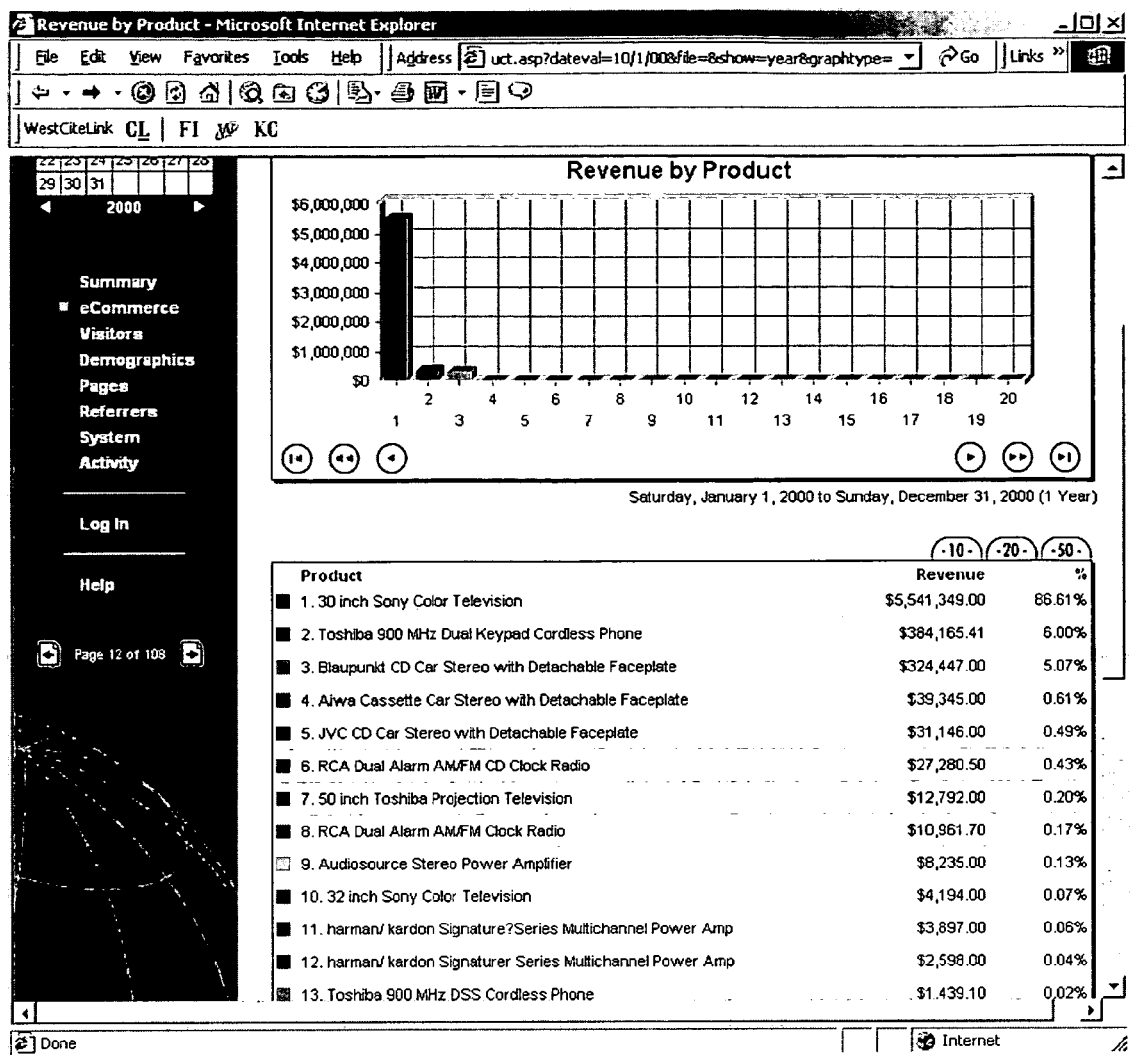
FIG. 4 is an example of a report showing revenue by product over a month's period as tracked and reported by the present invention.
Figure 5:
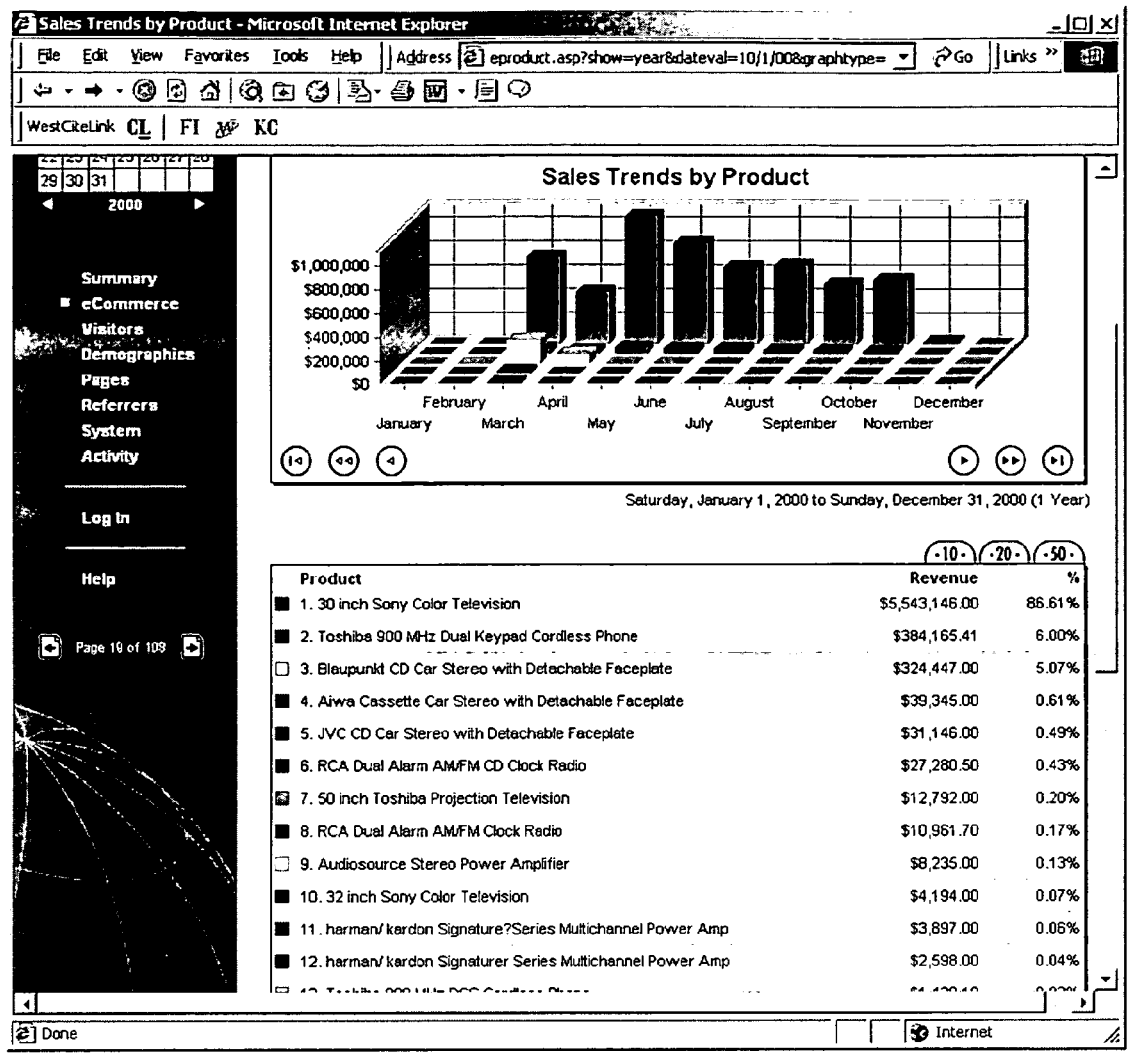
FIG. 5 is an example of a report showing revenue trends at a particular web site over the course of an entire year for five different products as tracked and reported by the present invention.

When the subscriber would like to see and print real-time statistics, the subscriber uses computer 16 to access server 18, which in turn is connected to database server 24 at the service provider's location. The owner can then see and print reports, like those available through the webtrendslive.com reporting service operated by the assignee of this application (examples of which are shown in FIGS. 3-5), that provide real-time information about the activity at server 12.

The data mining code embedded within the web page script operates to gather data about the visitor's computer. Also included within the web page script is a request for a 1×1 pixel image whose source is server 20. The 1×1 pixel image is too small to be viewed on the visitor's computer screen and is simply a method for sending information to server 20, which logs for processing by server 22, all web traffic information.

The data mined from the visitor computer by the data mining code is attached as a code string to the end of the image request sent to the server 20. By setting the source of the image to a variable built by the script (e.g. www.webtrendslive.com/button3.asp? id39786c45629t120145), all the gathered information can be passed to the web server doing the logging. In this case, for instance, the variable script "id39786c45629t120145" is sent to the webtrendslive.com web site and is interpreted by a decoder program built into the data analysis server to mean that a user with ID#39786, loaded client web site #45629 in 4.5 seconds and spent 1:20 minutes there before moving to another web site.

As will now be explained, applicant has developed the ability to analyze commercial data as well, e.g., number of orders, total revenues, etc., generated by server 18, and attach that information to the variable script image request so that commercial activity for a particular site can be tracked.

To this end, applicant has developed a method in which data relating to revenues, products sold, categories of products, etc., is collected, analyzed and displayed in various report formats. An example of code that can be used to implement this method is shown in Appendices I and II. When the subscriber opens an account with the service provider by connecting computer 16 to server 18, as described above, the code in Appendices I and II is transferred from service 18 to computer 16 in a known manner. The subscriber then determines which pages on the server 12 web site he or she would like to track. The subscriber then opens a text editor for each page to be tracked, and the code from Appendix I is pasted into the bottom of the page. Although the code in Appendix I does not provide an image on the page, it should be appreciated that code that includes an image such as a logo or the like, could be included in the Appendix I code. This would consequently both track the page and display an image thereon.

After the Appendix I code is pasted onto each page to be tracked, including an order confirmation page, the code in Appendix II, which defines a variable called ORDER, is also pasted onto the order confirmation page. This variable appears on line 7 of the Appendix I code.

The variable ORDER, among other things, defines the currency that is used to purchase the product. The currency need only be entered once, and in the example is USD for U.S. dollars. There are four other items that are included in the variable for each product ordered. In the order appearing in the variable they are first, the product name; second, the category that the product is in; third, the number of products purchased; and fourth, the unit price for the product. As can be seen in the Appendix II code, each item of information in the ORDER variable is included for each product purchased.

Figure 2:
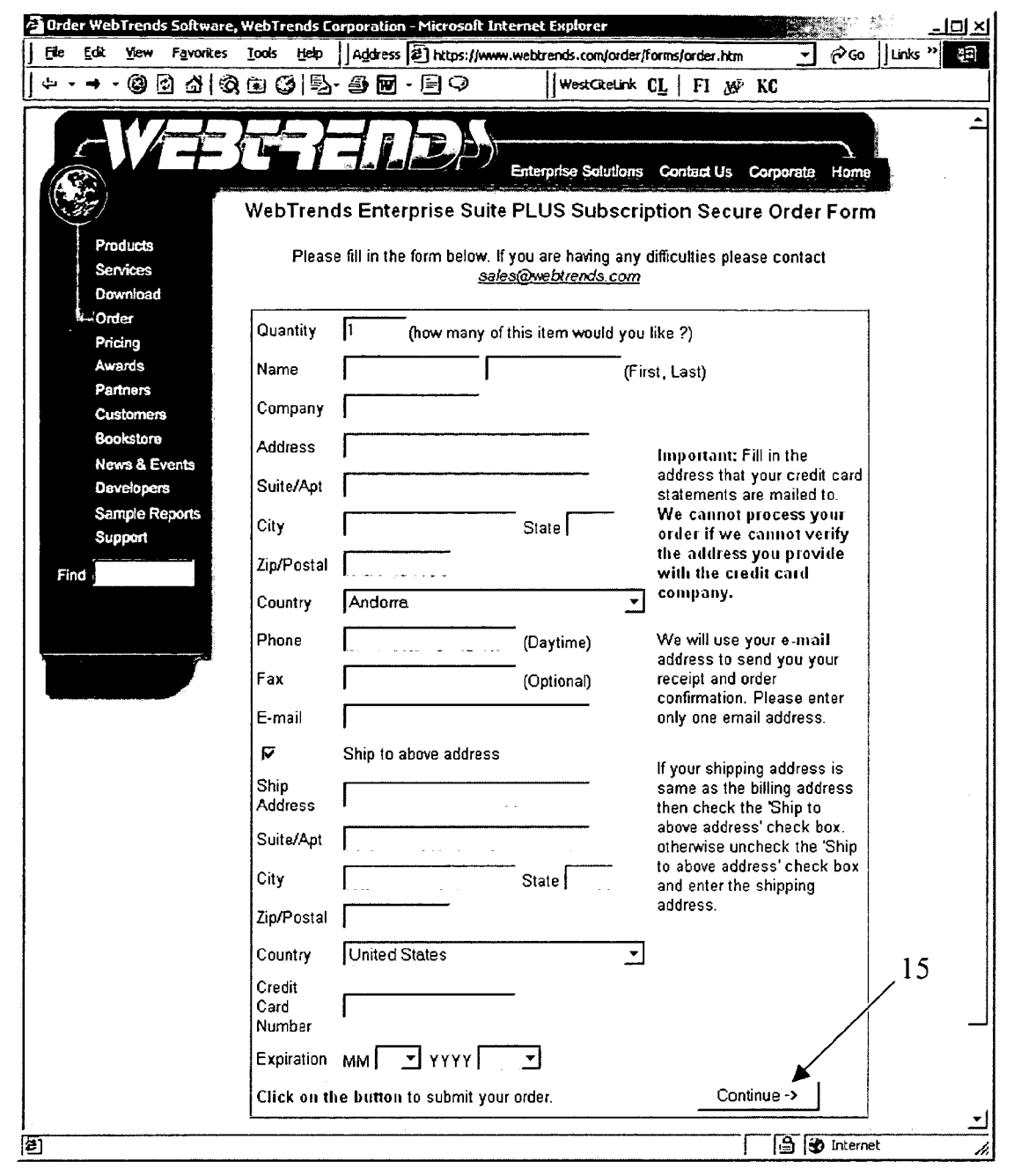

In operation, a site visitor using computer 14 first fills in all the information in the FIG. 2 form. The visitor then clicks button 15 in FIG. 2, and an order confirmation page (not shown) appears that includes the product, category, number, and unit price information, for each product ordered. The code in Appendices I and II collect this information, along with the usual data relating to traffic, visitors, visitors' systems, etc., and transmits it to service 20. This data is analyzed on server 22 as described above and stored on database 24.

An example of this process is described as follows. The variable image source constructed by the inserted commercial activity tracking script can be shown as, for instance, www.webtrendslive.com/button3.asp?usd-lawn_chair# 1-1445-002-2499, corresponding to price in U.S. dollars, product name: "lawn chair #1", product category #1445, 2 units sold at a per unit price of $24.99. Decoder software operable within server 22 reverse engineers the order to extract commercial activity data based on the source of the image requests.

When the business owner operating the website on server 12 wants to determine activity on that site, he or she logs onto his or her account on web server 18 via computer 16. After entering the appropriate user name and password, reports that are maintained in real time, as described above, are accessed, viewed, and—if desired—printed by the subscriber. Examples of various reports are shown in FIGS. 3-5 and are available through the webtrendslive.com reporting service, operated by the assignee of this application.

In addition to viewing the reports that are maintained in real time, the account owner can define time periods during which the information can be displayed in the format shown in the enclosed reports. There is also a feature that the account owner can select to cause reports to be periodically mailed to computer 16.

Having described and illustrated the principles of the invention in a preferred embodiment thereof, it should be apparent that the invention can be modified in arrangement and detail without departing from such principles. We claim all modifications and variation coming within the spirit and scope of the following claims.

APPENDIX I

1: <!--- Copyright 1999 WebTrends Corporation --->

2: <!--- http://www.webtrends.com --->

3: <!--- Modification of this code is not allowed and will permanently disable your account --->

4: <script language="JavaScript1.2">

5: <!---

6: var code = " ";

7: var ORDER = "<% ORDER %>"
   var SERVER = " ";

8: var title = escape(document.title);

```
9: var url = window.document.URL;
10: var orderstr = escape(order);
11: var get = "http://stats.webtrendslive.com/scripts/enter-
prise.cgi";
12: get += "?sid=000-99-9-7-27-7349&siteID=232";
13: get += "&title=" + title + "&url=" + url;
16: document.write("<" + "script src='" + get + "'></
script>");
17: //-->
18: </script>
19: <script language="JavaScript1.2">
20: document.write(code);
21: document.write("<" + "!---"); </script>
22: <img src="http://stats.webtrendslive.com/scripts/
enterprise3.cgi?si d=000-99-9-7-27-
23: 7349&siteID=232&url=">
24: <script language="JavaScript1.2">
25: document.write("---" + ">");
26: </script>
27: <noscript>
28: <img src="http://stats.webtrendslive.com/scripts/
enterprise3.cgi?si          d=000-99-9-7-27-29:
7349&siteID=232&url=">
30: </noscript>
31: <--- End of WebTrends Counter insertion --->
```

APPENDIX II

```
<%
ORDER = "D1;"
FOR i = 0 to UBOUND(orders)
ORDER = ORDER + product(i) & "," & category(i) >>
& "," & number_sold(i) & "," & unit_price(i)>>
& ";";
NEXT
```

('>>' indicates line continues)

We claim:

1. A method for tracking and reporting electronic commerce activity over a web site comprising:
   storing a web page on a first server coupled to a wide area network, said web page including data fields reflecting commerce transaction activity and data mining code;
   uploading the web page including the data fields and data mining code to a visitor computer responsive to a request over the wide area network from the visitor computer;
   accepting commerce information within the data fields of the web page at the visitor computer to form a completed web page;
   operating the data mining code on the visitor computer to obtain technical and commercial data; and
   receiving the technical and commercial data at a second server.

2. The method for tracking and reporting electronic commerce activity of claim 1 further including the steps of:
   receiving the completed web page at the first server;
   generating an order confirmation web page incorporating the commerce information from the data fields of the completed web page, said order confirmation web page including the data mining code; and
   uploading the order confirmation web page to the visitor computer.

3. The method for tracking and reporting electronic commerce activity of claim 2, further including the steps of:
   associating variables within the data mining code to the commerce information within the order confirmation page;
   confirming the commerce information at the visitor computer;
   receiving the order confirmation page from the visitor computer at the first server responsive to the step of confirming the commerce information; and
   receiving the associated variables at the second server responsive to the step of confirming the commerce information.

4. The method for tracking and reporting electronic commerce activity of claim 3, wherein the step of associating variables includes the steps of associating a variable with a product name of the commercial transaction.

5. The method for tracking and reporting electronic commerce activity of claim 3, wherein the step of associating variables includes the steps of associating a variable with a product category of the commercial transaction.

6. The method for tracking and reporting electronic commerce activity of claim 3, wherein the step of associating variables includes the steps of associating a variable with a number of products purchased in the commercial transaction.

7. The method for tracking and reporting electronic commerce activity of claim 3, wherein the step of associating variables includes the steps of associating a variable with a unit price of the commercial transaction.

8. The method of claim 3, further comprising the steps of:
   compiling the variables into a commercial transaction report; and
   posting the report for viewing over the wide area network.

9. The method of claim 1 further including the step of embedding the commercial data within a URL request directed at the second server.

* * * * *